US010710746B2

(12) United States Patent
Lombardini et al.

(10) Patent No.: US 10,710,746 B2
(45) Date of Patent: Jul. 14, 2020

(54) GROUND STATION AND TETHER FOR UNMANNED AERIAL VEHICLES

(71) Applicant: STABILIS INC., South Pasadena, CA (US)

(72) Inventors: Manuel Lombardini, South Pasadena, CA (US); Joseph Koehler, South Pasadena, CA (US); Rashad Moarref, South Pasadena, CA (US)

(73) Assignee: Stabilis Inc., South Pasadena, CA (US)

( * ) Notice: Subject to any disclaimer, the term of this patent is extended or adjusted under 35 U.S.C. 154(b) by 190 days.

(21) Appl. No.: 15/663,238

(22) Filed: Jul. 28, 2017

(65) Prior Publication Data

US 2018/0118374 A1 May 3, 2018

Related U.S. Application Data

(60) Provisional application No. 62/477,563, filed on Mar. 28, 2017, provisional application No. 62/368,811, filed on Jul. 29, 2016.

(51) Int. Cl.
  *B64F 3/02* (2006.01)
  *B60L 9/00* (2019.01)
  *B64C 39/02* (2006.01)

(52) U.S. Cl.
  CPC .................... *B64F 3/02* (2013.01); *B60L 9/00* (2013.01); *B64C 39/022* (2013.01);
  (Continued)

(58) Field of Classification Search
  CPC ............... B64C 39/022; B64C 39/024; B64C 2201/148; B64F 3/00; B64F 3/02
  See application file for complete search history.

(56) References Cited

U.S. PATENT DOCUMENTS 3,149,803 A * 9/1964 Petrides ................ B64C 39/022
                                                  244/17.13
3,223,359 A * 12/1965 Quick .................... B64C 39/022
                                                  244/17.13
(Continued)

FOREIGN PATENT DOCUMENTS

WO   WO 2013/112198 A2   8/2013
WO   WO 2017/066680 A1   4/2017

OTHER PUBLICATIONS

Invitation to Pay Additional Fees and Partial Search Report for Application No. PCT/US2017/044436, dated Nov. 30, 2017, 12 pages.

(Continued)

*Primary Examiner* — Zachary L Kuhfuss
(74) *Attorney, Agent, or Firm* — Lewis Roca Rothgerber Christie LLP (57) ABSTRACT

An unmanned aerial vehicle system includes a ground station including a case, a power supply housed in the case, and a tether having a first end and a second end opposite to the first end. The first end of the tether is coupled to the case. The unmanned aerial vehicle system also includes a module including smart battery authentication circuitry configured to be coupled to the second end of the tether. The module is configured to be connected to an unmanned aerial vehicle. The smart battery authentication circuitry enables the unmanned aerial vehicle to receive power from the power supply housed in the case when the module is connected to the unmanned aerial vehicle.

15 Claims, 9 Drawing Sheets

(52) U.S. Cl.
CPC ......... *B64C 39/024* (2013.01); *B60L 2200/10* (2013.01); *B64C 2201/027* (2013.01); *B64C 2201/042* (2013.01); *B64C 2201/066* (2013.01); *B64C 2201/108* (2013.01); *B64C 2201/148* (2013.01); *B64C 2201/201* (2013.01)

(56) References Cited

U.S. PATENT DOCUMENTS

| | | | | |
|---|---|---|---|---|
| 3,381,922 | A * | 5/1968 | Laing | B05B 3/18 244/136 |
| 5,070,955 | A * | 12/1991 | Lissaman | B64C 27/20 180/117 |
| 6,119,837 | A * | 9/2000 | Tschurbanoff | B65H 75/425 191/12.2 A |
| 7,510,142 | B2 * | 3/2009 | Johnson | B64C 39/022 244/17.11 |
| 9,623,760 | B2 * | 4/2017 | Wang | B60L 11/1822 |
| 9,800,091 | B2 * | 10/2017 | Nugent, Jr. | H04B 10/807 |
| 2007/0200027 | A1 | 8/2007 | Johnson | |
| 2011/0180667 | A1 * | 7/2011 | O'Brien | B64C 39/022 244/135 R |
| 2015/0041598 | A1 * | 2/2015 | Nugent | H02J 17/00 244/53 R |
| 2015/0191259 | A1 * | 7/2015 | Giovannini | B64F 3/02 701/3 |
| 2015/0298786 | A1 * | 10/2015 | Stigler | B64B 1/10 244/30 |
| 2016/0082460 | A1 * | 3/2016 | McMaster | B05B 9/007 701/2 |
| 2016/0144734 | A1 * | 5/2016 | Wang | B60L 11/1822 701/17 |
| 2017/0110901 | A1 * | 4/2017 | Amarasekara | H02J 50/10 |
| 2017/0144754 | A1 * | 5/2017 | Limvorapun | B60L 53/54 |
| 2017/0190260 | A1 * | 7/2017 | Wang | B60L 11/1822 |
| 2017/0197718 | A1 * | 7/2017 | Buchmueller | B64D 1/12 |
| 2017/0240277 | A1 * | 8/2017 | Molnar | B64C 39/022 |
| 2017/0259941 | A1 * | 9/2017 | Briggs, IV | B64F 3/02 |
| 2018/0118374 | A1 * | 5/2018 | Lombardini | B60L 9/00 |
| 2018/0251216 | A1 * | 9/2018 | Whitaker | B64C 39/022 |
| 2018/0290748 | A1 * | 10/2018 | Corban | B64C 39/024 |

OTHER PUBLICATIONS

International Search Report and Written Opinion for Application No. PCT/US2017/044436, dated Feb. 26, 2018, 18 pages.

* cited by examiner

GROUND STATION AND TETHER FOR UNMANNED AERIAL VEHICLES

CROSS-REFERENCE TO RELATED APPLICATIONS

This application claims priority to and the benefit of U.S. Provisional Application No. 62/477,563, filed Mar. 28, 2017, and U.S. Provisional Application No. 62/368,811, filed Jul. 29, 2016, the entire contents of both of which are incorporated herein by reference.

FIELD

The present disclosure relates generally to unmanned aerial vehicle systems.

BACKGROUND

Unmanned aerial vehicles ("UAVs") exist in a variety of different configurations, including rotary aircraft, such as single-rotor and multi-rotor helicopters, fixed wing aircraft, and lighter-than-air aircraft (i.e., dirigibles). UAVs may be used for a variety of purposes, including both recreational and professional applications, such as geological surveying and aerial photography (e.g., photographing outdoor sporting events). However, conventional untethered UAVs include onboard batteries with relatively small capacities, which limit the endurance of the UAVs and the practicability of using these UAVs for applications requiring a long-duration flight. For instance, conventional onboard batteries (e.g., lithium polymer (LiPo) batteries) may permit only 15 to 25 minutes of flight depending on the size of the UAV and the conditions under which the UAV is operated.

Tethered UAVs that are powered by a power source in a ground station offer potentially unlimited endurance or at least extended endurance, depending on the type of power source in the ground station. However, many conventional UAVs are programmed to require use of a proprietary onboard battery and are therefore incompatible with ground station-based power sources.

Additionally, equipment (such as cameras or other sensors) onboard conventional untethered UAVs transmit data captured by the equipment to the ground via wireless signals (e.g., transmitted via wireless local area network channels). Transmitting data via wireless signals typically requires the data to be compressed or otherwise degraded in quality. Additionally, conventional UAVs typically lack onboard data storage and/or data processing equipment due to the size and payload restrictions of these UAVs. Accordingly, conventional untethered UAVs may be unsuitable for professional applications or other applications where high-quality data or other information is desired.

SUMMARY

The present disclosure is directed to various embodiments of an unmanned aerial vehicle system. In one embodiment, unmanned aerial vehicle system includes a ground station including a case, a power supply housed in the case, and a tether having a first end and a second end opposite to the first end. The first end of the tether is coupled to the case. The unmanned aerial vehicle system also includes a module including smart battery authentication circuitry configured to be coupled to the second end of the tether. The module is configured to be connected to an unmanned aerial vehicle. The smart battery authentication circuitry enables the unmanned aerial vehicle to receive power from the power supply housed in the case when the module is connected to the unmanned aerial vehicle.

The unmanned aerial vehicle system may also include a spooling system housed in the case. The spooling system is configured to retract and deploy the tether from the case. The spooling system may include a reel, a drive motor coupled to the reel configured to rotate the reel, and a roller configured to apply tension to the tether. The roller is configured to pivot relative to the reel.

The unmanned aerial vehicle system may also include a level-winder assembly configured to substantially evenly distribute the tether along the reel as the drive motor is operated to rewind the tether around the reel. The level-winder assembly may include a guide defining an opening configured to accommodate the tether. The guide is configured to pivot in a reciprocal manner. The level-winder assembly also includes an actuator having a first end coupled to the guide and a second end coupled to the drive motor. The actuator is configured to reciprocate to pivot the guide. Operation of the drive motor to rotate the reel is configured to reciprocate the actuator and pivot the guide. The case may include a platform to support the unmanned aerial vehicle, and the platform may define an opening configured to accommodate the tether. The opening may be a straight slot or a sinusoidal-shaped opening.

The unmanned aerial vehicle system may include a tether limiter device configured to stop the reel from rotating once a maximum length of the tether has been unwound from the reel. The tether limiter device may include a linear actuator coupled to the drive motor. The drive motor is configured to move the linear actuator between a first position when the tether is fully rewound around the reel and a second position when the tether is fully unwound from the reel. The tether limiter device also includes a sensor configured to detect when the linear actuator is in the second position. The sensor is configured to send a signal to stop the drive motor from rotating the reel when the sensor detects that the linear actuator is in the second position. The sensor may be an optical switch.

The ground station may also include a processor housed in the case for processing data received from the unmanned aerial vehicle.

The module may include a transformer and at least one electrical contact for electrically coupling the module to the unmanned aerial vehicle.

The unmanned aerial vehicle system may also include a quick-release connector coupled to the second end of the tether. The quick-release connector is configured to detach the unmanned aerial vehicle from the tether while the unmanned aerial vehicle is in flight.

The unmanned aerial vehicle system may also include a wireless router housed in the case. The wireless router is configured to transmit visual information received from the unmanned aerial vehicle to a remote electronic device.

The unmanned aerial vehicle system may include a transponder housed in the case. The transponder is configured to transmit a location of the ground station.

The unmanned aerial vehicle system may include a receptacle in the ground station configured to accommodate the module.

The present disclosure is also directed to various methods of operating an unmanned aerial vehicle with a ground station. In one embodiment, the method includes coupling the unmanned aerial vehicle to the ground station with a tether, transmitting a position of the ground station from the ground station to the unmanned aerial vehicle through the tether, and controlling an aerial position of the unmanned aerial vehicle based on the position of the ground station transmitted to the unmanned aerial vehicle.

Transmitting the position of the ground station may include transmitting the position from the ground station to the unmanned aerial vehicle through the tether. Transmitting the position of the ground station may include wirelessly transmitting the position from the ground station to the unmanned aerial vehicle.

The method may also include collecting visual information with the unmanned aerial vehicle, transmitting the visual information from the unmanned aerial vehicle to the ground station through the tether, and transmitting the visual information from the ground station to an external device.

The method may include flying the unmanned aerial vehicle and detaching the unmanned aerial vehicle from the tether during the flying of the unmanned aerial vehicle. Detaching the unmanned aerial vehicle from the tether may include sending a signal through the tether to a mechanical connector connecting the unmanned aerial vehicle to the tether.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

The features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

The present disclosure is directed to various embodiment of an unmanned aerial vehicle system including a ground station configured to communicate with and/or supply power to an unmanned aerial vehicle (UAV) (i.e., a drone) via a tether extending between the ground station and the UAV. In one or more embodiments, the ground station and the tether are configured to supply the drone with a recurrent power supply such that the drone may fly with unlimited endurance.

With reference now to FIGS. 1A-2C, an unmanned aerial vehicle (UAV) system 100 according to one embodiment of the present disclosure includes a ground station 101 for communicating with and supplying power to an unmanned aerial vehicle (i.e., a drone) 102 and a tether 103 configured to couple (i.e., tether) the drone 102 to the ground station 101. The ground station 101 includes a housing or a case 104 defining an interior chamber or compartment 105 (see FIGS. 3A-3D) for housing various components of the UAV system 100 described below. In the illustrated embodiment, the case 104 includes a cover 106 (e.g., a lid) having a generally planar upper platform configured to support the drone 102, although in one or more embodiments, the upper platform of the cover 106 may be non-planar. The tether 103 is configured to move between a fully retracted position when the drone 102 is on the platform 105 (i.e., when the drone 102 is not in flight) and an extended position when the drone 102 is in flight.

With reference now to the embodiment illustrated in FIGS. 3A-3D, the ground station 101 includes a spooling system 107 housed in the interior chamber 105 of the case 104 for retracting and extending the tether 103. The cover 106 is omitted in FIGS. 3A-3D to reveal the internal components of the ground station 101. In the illustrated embodiment, the spooling system 107 includes a spool or reel 108 around which the tether 103 is wound, a drive motor 109 connected to a gearbox 110 configured to drive (arrow 111) the reel 108 to wind or unwind at least a portion of the tether 103 around or from the reel 108, a roller 112 configured to apply tension to the tether 103, and a level-winder assembly 113 configured to ensure even or substantially even distribution of the tether 103 along the reel 108 as the tether 103 is wound around the reel 108 by the drive motor 109.

In the illustrated embodiment, the roller 112 and the reel 108 are each cylindrical members and the roller 112 has a smaller diameter than the reel 108. Additionally, in the illustrated embodiment, the roller 112 is configured to rotate about an axis $L_1$ parallel or substantially parallel to an axis $L_2$ about which the reel 108 is configured to rotate and the roller 112 is positioned in front of the reel 108.

With continued reference to the embodiment illustrated in FIGS. 3A-3D, opposite ends of the roller 112 are connected to a pair of pivot arms 114, 115 by a pair of fasteners 116, 117, respectively. In the illustrated embodiment, the roller 112 is rotatably supported on a roller bearing. The roller bearing extends through the center of the roller 112 and opposite ends of the roller bearing are coupled to the pivot arms 114, 115 by the fasteners 116, 117. The pivot arms 114, 115 and the roller 112 are configured to rotate together (arrow 118) (i.e., pivot or swing) up and down relative to the reel 108. In the illustrated embodiment, first ends of the pivot arms 114, 115 are coupled to the roller 112 and second ends of the pivot arms 114, 115 opposite to the first ends are coupled to pins 119, 120 that are rotatably received in roller bearings 121, 122, respectively. The engagement between the pins 119, 120 and the roller bearings 121, 122 enables the pivot arms 114, 115 and the roller 112 to rotate (arrow 118) (i.e., pivot) relative to the reel 108. In the illustrated embodiment, a pivot axis $L_3$ defined by the pins 119, 120 and the roller bearings 121, 122 about which the pivot arms 114, 115 and the roller 112 are configured to rotate (arrow 118) is parallel or substantially parallel to the axis of rotation $L_2$ of the reel 108.

Additionally, in the illustrated embodiment, the roller 112 extends between a pair of support brackets 123, 124. In the illustrated embodiment, the support brackets 123, 124 define arcuate openings 125, 126, respectively, configured to accommodate the fasteners 116, 117, respectively, coupling the roller 112 to the pivot arms 114, 115. In the illustrated embodiment, the angular extent of the arcuate openings 125, 126 corresponds or substantially corresponds to the maximum angular rotation (arrow 118) of the roller 112 and the pivot arms 114, 115 (e.g., the maximum upward and down angular pitch of the roller 112 and the pivot arms 114, 115), although in one or more embodiments the angular extent of the arcuate openings 125, 126 may be greater than the maximum angular rotation of the roller 112 and the pivot arms 114, 115.

In the illustrated embodiment, a portion of the tether 103 is wound around the reel 108 and a segment of the tether 103 that is unwound from the reel 108 extends underneath the roller 112 and up to a free end 127 (see FIGS. 1A and 2A) of the tether 103 outside of the case 104. The roller 112 engages a portion of the unwound segment of the tether 103 that extends underneath the roller 112. In the illustrated embodiment, the combined weight of the roller 112 and the pivot arms 114, 115 passively applies tension on the tether 103. In one or more embodiments, the spooling system 107 may include one or more components, such as a spring and/or a torque motor, to actively apply tension on the tether 103 in addition to the combined weight of the roller 112 and the pivot arms 114, 115.

With continued reference to the embodiment illustrated in FIG. 3A-3D, the spooling system 107 also includes an angular sensor 128 (e.g., an angular potentiometer) configured to measure the angular position of the roller 112 and the pivot arms 114, 115 (e.g., the angular position of the roller 112 relative to the spool 108). In the illustrated embodiment, the angular sensor 128 is configured to measure the angular position of one of the pins 119, 120 connected to one of the pivot arms 114, 115, which corresponds to the angular position of the pivot arms 114, 115 and the roller 112. In the illustrated embodiment, the spooling system 107 also includes a microcontroller programmed with a PID control algorithm configured to receive a signal from the angular sensor 128 and, based on the angular position of the roller 112 determined by the angular sensor 128, control the drive motor 109 to drive the reel 108 (e.g., wind or unwind the tether 103 around the reel 108). For instance, in one or more embodiment in which the angular sensor 128 detects that the roller 112 has rotated (arrow 118) downward relative to the reel 108, the microcontroller may drive the drive motor 109 to rotate the reel 108 to rewind a portion of the tether 103 and thereby reduce slack in the tether 103 (e.g., to prevent the tether 103 from hanging or touching the ground). When the angular sensor 128 detects that the roller 112 has rotated (arrow 118) upward relative to the reel 108 (e.g., due to the upward acceleration of the drone 102 connected to the tether 103), the microcontroller may drive the drive motor 109 to rotate the reel 108 to unwind an additional portion of the tether 103 and thereby reduce the tension on the tether 103. In this manner, the spooling system 107 is configured to automatically adjust (i.e., rotate) the reel 108 to maintain a constant or substantially constant tension on the tether 103 and smoothly control acceleration and deceleration motions from the drone 102 connected to the tether 103. Accordingly, unlike conventional mechanisms that rely on sensing the angular acceleration of a reel (i.e., the second derivative of the rotation angle of the reel) to drive the reel and thereby control the tension on the tether, the spooling system 107 according to one or more embodiments of the present disclosure measures the angle of the roller 112 to drive the reel 108 and control the tension on the tether 103, which provides a smoother operation of the retraction and extension of the tether 103 compared to conventional mechanisms. In one or more embodiments, the spooling system 107 may have any other suitable configuration for winding the tether onto the reel, such as, for instance, a coil spring biased to rewind the tether 103 around the spool 108 as the drone 102 descends.

The level-winder assembly 113 is configured to ensure even or substantially even distribution of the tether 103 along the reel 108 as the tether 103 is wound onto the reel 108. In the illustrated embodiment, the level-winder assembly 113 includes a pair of support members 129, 130 (i.e., a first support member 129 and a second support member 130), a guide 131 extending between the support members 129, 130, and an actuator 132 (e.g., a crank arm) coupled to the guide 131. A first end 133 of the guide 131 is pivotally coupled (arrow 134) to the first support member 129 and a second end 135 of the guide 131 opposite to the first end 133 is supported by the second support member 130. In the illustrated embodiment, the first support member 129 extends laterally between a pair of opposing sides of the case 104, although in one or more embodiments the first support member 129 may be supported in the case 104 in any other suitable manner. Additionally, in one or more embodiments, the guide 131 may be pivotally coupled directly to the case 104. In the illustrated embodiment, the second support member 130 defines a track 136 through which the second end 135 of the guide 131 extends. The track 136 in the second support member 130 is configured to support the guide 131 as it is pivoted (arrow 134) back and forth by the actuator 132. In the illustrated embodiment, the guide 131 defines an opening 137 (e.g., an elongated slot) proximate to the second end 135 of the guide 131. In the illustrated embodiment, the length of the opening 137 is oriented along the length of the guide 131. The tether 103 is configured to extend through the opening 137 in the guide 131 and, as described in more detail below, the pivoting motion (arrow 134) of the guide 131 is configured to guide the tether 103 back and forth along the length of the reel 108 to ensure uniform or substantially uniform distribution of the tether 103 along the reel 108.

In the illustrated embodiment, a first end 138 of the actuator 132 is coupled to the guide 131 by a ball linkage 139 and a second end 140 of the actuator 132 is mechanically coupled to the drive motor 109 that is configured to drive the reel 108. The actuator 132 is configured to pivot (arrow 134) the guide 131 relative to the first support member 129 when the drive motor 109 is actuated to operate the reel 108. In the illustrated embodiment, the second end 140 of the actuator 132 is mechanically coupled to the output of the drive motor 109 by a worm gear reduction 141, a spur gear 142 engaged by the worm gear reduction 141, and a ball-linkage 143 coupled to the spur gear 142. In the illustrated embodiment, the ball-linkage 143 is directly connected to the second end 140 of the actuator 132. In the illustrated embodiment, the worm gear reduction 141 is configured to be engaged by one of the gears in the gearbox 110.

Accordingly, when the drive motor 109 is operated to rotate (arrow 111) the reel 108 (e.g., to wind at least a portion of the tether 103 on the reel 108), one of the gears in the gearbox 110 rotates the worm gear reduction 141, which rotates (arrow 144) the spur gear 142. The rotation (arrow 144) of the spur gear 142 forces the actuator 132 to reciprocate (arrow 145) in a direction generally parallel to the axes of rotation $L_1$, $L_2$ of the roller 112 and the reel 108, respectively, and the reciprocating motion (arrow 145) of the actuator 132 forces the guide 131 to pivot (arrow 134) back and forth with respect to the first support member 129. In this manner, the pivoting motion (arrow 145) of the guide 131 is proportional to the output of the drive motor 109 driving the reel 108 (e.g., an increase in the speed at which the drive motor 109 rotates the reel 108 causes a proportional increase in the speed at which the guide 131 pivots back and forth, and a decrease in the speed at which the drive motor 109 rotates the reel 108 causes a proportional decrease in the speed at which the guide 131 pivots back and forth). In one or more embodiments, the sweep of the guide 131 (e.g., the distance between the extreme positions of the guide 131) is equal or substantially equal to a length of the reel 108, although in one or more embodiments the sweep of the guide 131 may be less than the length of the reel 108. Additionally, as the tether 103 is being rewound onto the reel 108, the tether 103, which extends through the opening 137 in the guide 131, is guided back and forth along the length or a portion of the length of the roller 112 and the reel 108 by the reciprocating motion (arrow 145) of the guide 131. In this manner, the level-winder assembly 107 is configured to guide the tether 103 back-and-forth across a length of the reel 108 to ensure even or substantially even distribution of the tether 103 along the reel 108. Otherwise, the tether 103 may tend to wind around one or more discrete locations along the reel 108, which could cause the tether 103 to become entangled and/or not permit the entire length of the tether 103 to be wound on the reel 108 due to space constraints. Additionally, if the tether 103 were wound non-uniformly around the reel 108 (e.g., if the tether 103 accumulated in discrete locations along the reel 108 such that, for instance, certain portions of the reel 108 had five layers of tether 103 windings and other portions of the reel 108 had ten layers of tether 103 windings), Joule heating generated when the tether 103 is energized to transmit power to the drone 102 could present issues (e.g., damage and/or inhibit proper operation) to one or more components of the ground station 101 and/or the tether 103. In contrast, uniformly or evenly distributing the tether 103 along the reel 108 is configured to maximize or at least improve cooling of the tether 103 due to resistive heat losses in the tether 103.

With reference again now to the embodiment illustrated in FIGS. 1A-2C, the cover 106 (e.g., the upper platform of the cover 106) of the case 104 of the ground station 101 includes an opening 146 through which the tether 103 extends. In one or more embodiments, the opening 146 may be a straight or substantially straight slot that is parallel or substantially parallel to the axes of rotation $L_1$, $L_2$ of the roller 112 and the reel 108. Additionally, in one or more embodiments, the length of the opening 146 may be the same or substantially the same as the sweep of the guide 131 (i.e., the distance between the extreme positions of the guide 131). In one or more embodiments, the opening 146 may be sinusoidal curve or a substantially sinusoidal curve. Additionally, in one or more embodiments, the opening 146 may house a grommet or a fairlead configured to protect the tether 103 against abrasion.

Figure 3A:
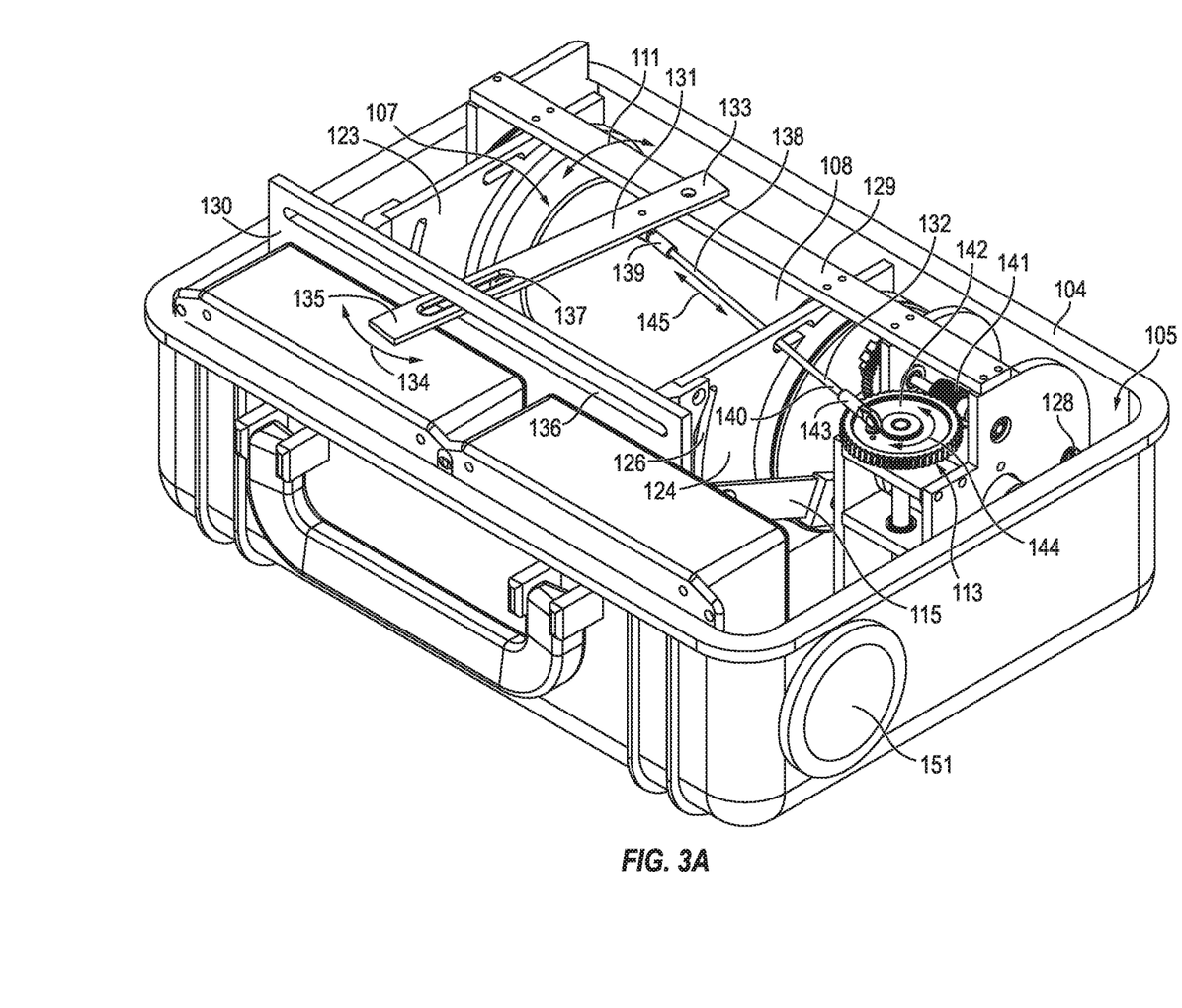
FIGS. 3A-3D are a first perspective view, a second perspective view, a top view, and a vertical cross-sectional view, respectively, of a UAV system according to one embodiment of the present disclosure.
Figure 3B:
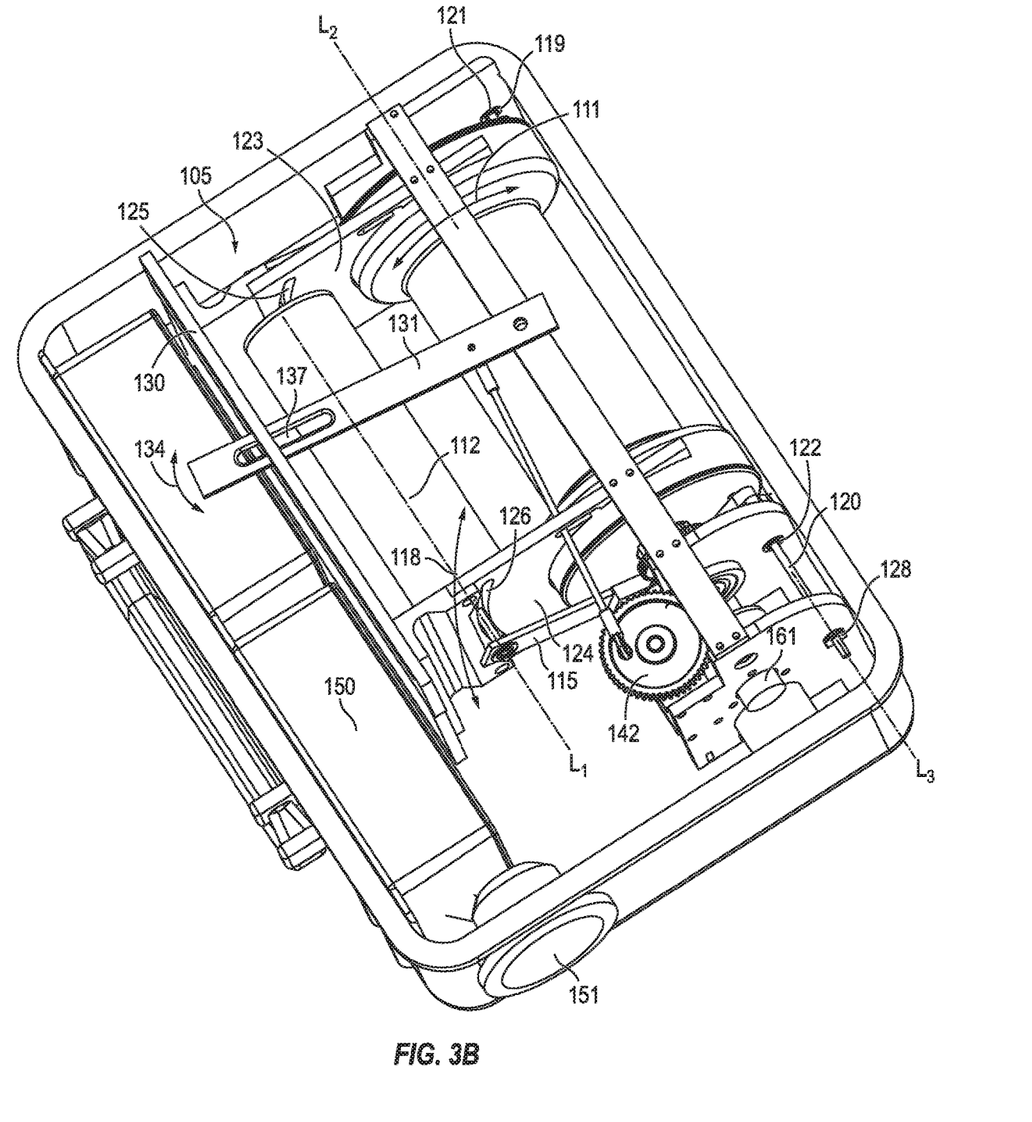
Figure 3C:
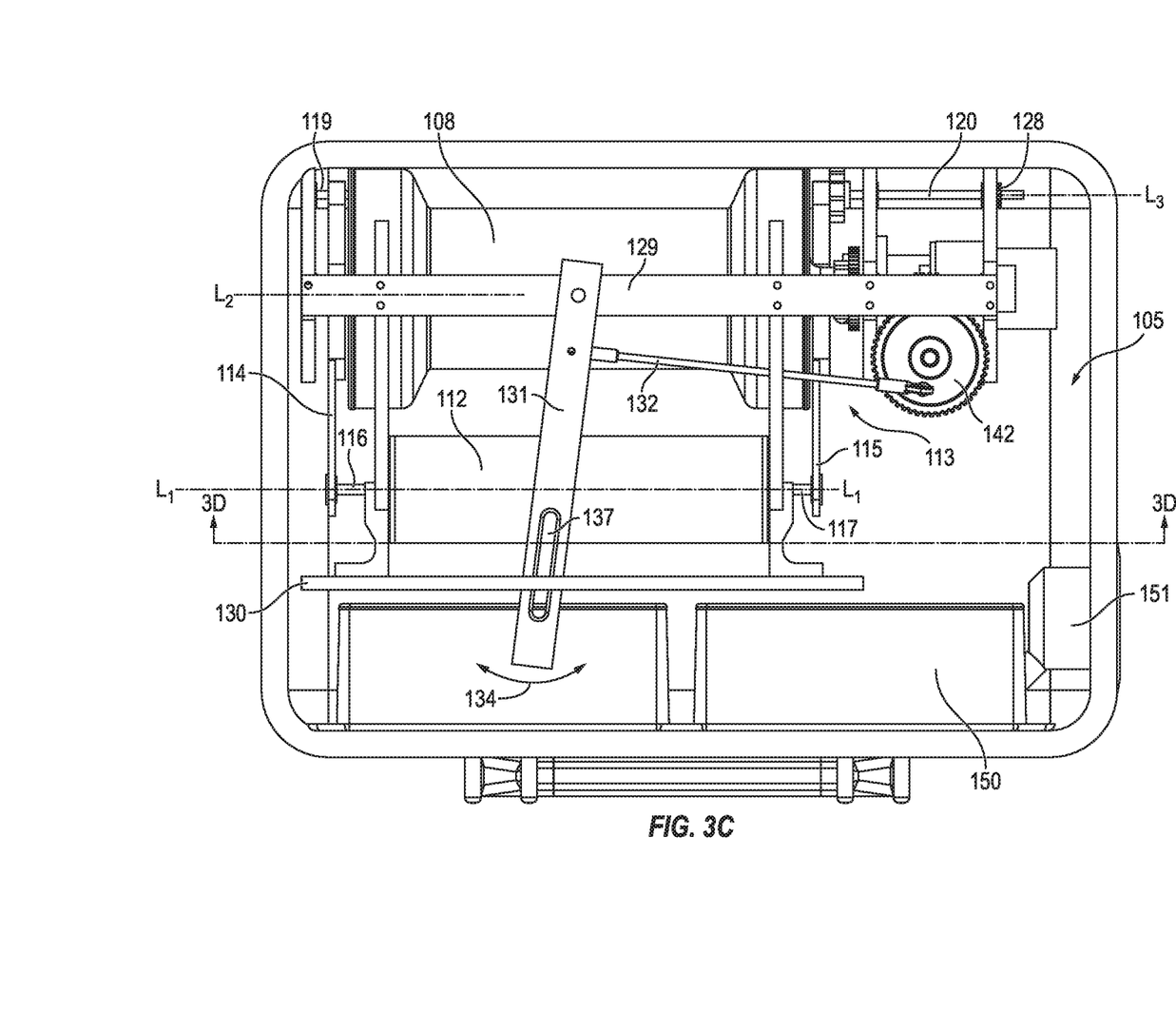
Figure 3D:
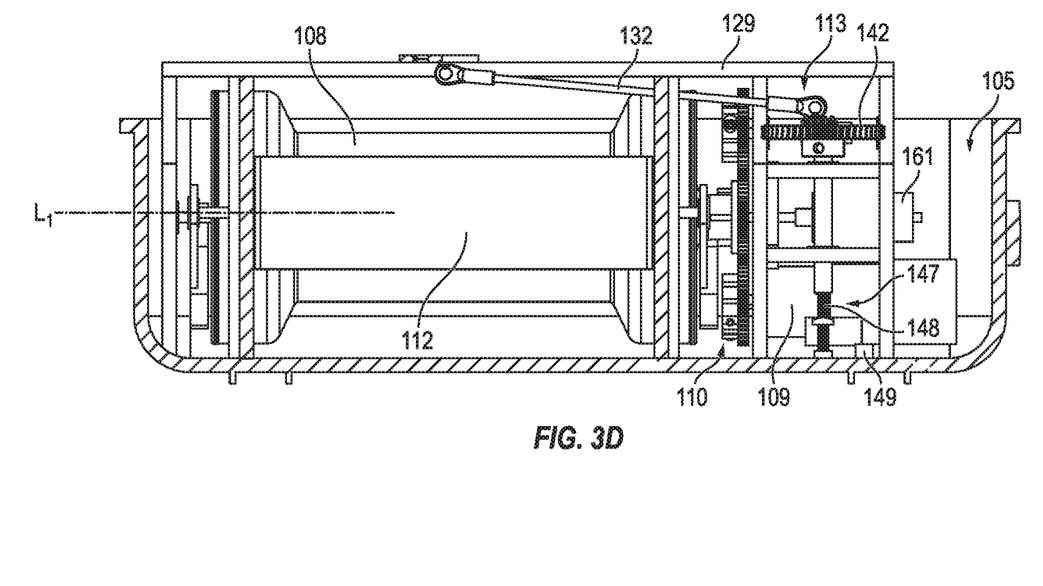

With reference again now to the embodiment illustrated in FIG. 3D, the ground station 101 also includes a tether limiter device 147 configured to stop the reel 108 from rotating once the maximum length of the tether 103 has been deployed and thereby prevent the drone 102 from flying farther than the maximum length of the tether 103 in the fully deployed, unwound state. In the illustrated embodiment, the tether limiter device 147 includes a linear actuator 148 (e.g., a screw) coupled to one of the gears in the gearbox 110 and a sensor 149 (e.g., an optical switch or a linear potentiometer) configured to detect one or more positions of the linear actuator 148. In the illustrated embodiment, the linear actuator 148 is a screw threadedly engaged with internal threads in one of the gears in the gearbox 110.

When the drive motor 109 is actuated to rotate the reel 108 to either wind or unwind the tether 103, the gears in the gearbox 110 rotate. The rotation of the gears in the gearbox 110 causes the linear actuator 148, which is threadedly engaged to one of the gears in the gearbox 110, to travel (e.g., up or down) relative to the gear in the gearbox 110, depending on the direction in which the reel 108 is rotated by the drive motor 109. The linear actuator 148 is configured to move a fixed maximum distance relative to the gear in the gearbox 110 (i.e., a fixed distance between a fully retracted position and a fully extended position) that is proportional to the maximum length of the tether 103. In the illustrated embodiment, unwinding a tether having a maximum deployed length of approximately 1,000 feet results in the linear actuator 148 moving approximately 1 inch between its fully retracted and fully extended positions (i.e., an approximately 1-inch travel of the linear actuator corresponds to an approximately 1,000 foot deployment of the tether 103 from the reel 108). The gear in the gearbox 110 is configured to move the linear actuator 148 away from the sensor 149 (e.g., up in FIG. 3D) when the drive motor 109 is operating the reel 108 to rewind the tether 103, and the gear is configured to move the linear actuator 148 toward the sensor 149 (e.g., down in FIG. 3D) when the drive motor 109 is operating the reel 108 to unwind the tether 103. In the illustrated embodiment, the sensor 149 (e.g., the optical switch) is positioned such that the linear actuator 148 (e.g., the screw) passes in front of the sensor 149 when the linear actuator 148 is in its maximum extended position, which corresponds to the maximum unwound/deployed position of the tether 103. Although in the illustrated embodiment the sensor 149 is coupled a base of the case 104, in one or more embodiments the sensor 149 may be positioned in any other suitable location in the case 104.

When the linear actuator 148 passes in front of the sensor 149 and the sensor 149 detects the linear actuator 148, the sensor 149 is configured to send a signal to stop the drive motor 109 from operating (i.e., rotating) the reel 108 to unwind the tether 103 any further. In this manner, the tether limiter device 147 is configured to automatically stop the drive motor 109 and the rotation of the reel 108 when the tether 103 has reached its maximum deployed/unwound position. In one or more embodiments, the tether limiter device 147 may include any other suitable number of sensors 149 (e.g., two or more optical sensors) to measure two or more positions of the linear actuator 148 and this additional positional information may be used, for instance, to stop the reel 108 before the tether has reached the maximum unwound position (e.g., at a desired intermediate position set by the user). The tether limiter device 147 including the optical switch 149 is configured to provide a more accurate and absolute determination that the maximum length of the tether 103 has been deployed compared to conventional measurement devices, such as angular potentiometers. For instance, conventional angular potentiometers that sense the number of turns of the reel to determine the length of tether that has been unwound from the reel require proper initialization (e.g., conventional angular potentiometers provide a relative measurement of the winding of the reel and must be reset each time to indicate that the reel and the tether are in the fully wound position). Failure to properly initialize the angular potentiometer will result in an inaccurate determination that the full length of the tether has been deployed (e.g., the angular sensor may incorrectly determine that the tether has reached its fully deployed position and thereby prematurely stop the drive motor from unwinding the tether from the reel, which prevents the drone from reaching its maximum flight ceiling, or the angular potentiometer may fail to determine that the tether has reached its fully deployed position even after all of the tether has been unwound from the reel). Additionally, conventional angular potentiometers may fail to initialize properly due to, for example, poor programming and/or susceptibility to temperature variation. Accordingly, the tether limiter device 147 of the present disclosure including the optical switch 149 is configured to determine the absolute position of the tether 103 and the reel 108 (i.e., the absolute length of the tether 103 that has been deployed from the reel 108) compared to conventional angular potentiometers that are configured to measure the relative position of the tether and the reel, which is prone to errors due to improper initialization of the angular potentiometer.

In one or more embodiments, the tether limiter device 147 may include any other suitable mechanism or mechanisms for limiting the deployment of the tether 103. For instance, in one or more embodiments, the tether limiter device 147 may include a ratchet brake configured to engage the reel 108 and a sensor configured to measure or calculate the number of tags or markers along the tether 103 that pass the sensor as the tether 103 is deployed and/or a sensor configured to measure or calculate the number of rotations of the reel 108 as the tether 103 is being deployed. When the sensor measures that the total number of markers along the tether 103 have passed the sensor or that the number of rotations of the reel 108 corresponding to the full deployment of the tether 103 has been reached, the sensor may send a signal causing the ratchet brake to engage the reel 108 and thereby prevent further deployment of the tether 103. In one or more embodiments, the tether limiter device 147 may include a stop (e.g., a blocker) positioned along the tether 103 proximate to one end of the tether 103 that is larger than the size of the opening 146 (e.g., the slot) in the platform 105 of the ground station 101. The engagement between the stop and the platform 105 of the ground station 101 is configured to prevent further deployment of the tether 103.

With continued reference to the embodiment illustrated in FIGS. 3A-3D, the ground station 101 also includes a power supply 150 (e.g., a generator or a rechargeable battery) that is configured to transmit electrical power to the drone 102 through the tether 103 and an electrical outlet 151 (e.g., a power inlet port in a sidewall of the case 104) electrically connected to the power supply 150. The electrical outlet 151 permits the power supply 150 to be plugged into a power grid or other external power supply (e.g., the power supply on a vehicle, such as a car or a boat). Additionally, the ground station 101 also includes a power switch 152 (e.g., a power button on the upper platform 105) for supplying power from the power supply 150 to the tether 103 and the other components of the UAV system 100 housed in the ground station 101. Accordingly, in one or more embodiments, the ground station 101 is configured to supply the drone 102 with a recurrent power supply such that the drone 102 may fly with unlimited endurance (i.e., ground station 101 and the tether 103 may enable the drone 102 to fly indefinitely). Additionally, in one or more embodiments, the power switch 152 may be configured to trigger an emergency landing of the drone when the power switch 152 is switched to the off position. For instance, in one or more embodiments in which a module configured to connect to the drone 102 includes a backup battery, described in more detail below, when the power switch 152 is switched to the off position and power is no longer supplied to the drone 102 from the power supply 150, the backup battery in the module will power the drone 102 during the emergency landing.

The tether 103 is also configured to improve the safety of the drone 102 by restricting the drone 102 to a confined airspace or flight envelope (e.g., limiting the ceiling and range of the drone 102) compared to an untethered drone that may fly unrestricted. Restricting the drone 102 to a limited airspace frees the operator to perform other operations or tasks which would otherwise be consumed ensuring that the drone 102 remained within a desired airspace. Additionally, in one or more embodiments in which control signals, in addition to power supply, are supplied to the drone via the tether 103, the UAV system 100 is not susceptible to signal jamming, unlike conventional untethered drones that rely on wireless signals to communicate with the drone.

In one or more embodiments, the UAV system 100 may include a series of sensors (e.g., pressure sensors and/or temperature sensors) positioned along the length of the tether 103 to simultaneously measure, for instance, atmospheric conditions at different altitudes (e.g., measure stratifications of the atmosphere). These sensors may be used, for instance, to improve the scientific community's understanding of the climate and climate change (e.g., marine layer, diffusion of pollutants, modeling of the atmospheric boundary layer, etc.). The sensors may be equidistantly spaced at regular intervals along the tether 103 or may be irregularly spaced along the tether 103. Accordingly, unlike conventional untethered drones with onboard sensors that measure various conditions consecutively by ascending or descending the drone to different altitudes, the sensors positioned along the length of the tether 103 facilitate measuring various conditions at different altitudes simultaneously.

The tether 103 also houses a data transmission line (e.g., a fiber optic line) for transmitting data received by the drone 102 (e.g., data gathered by a camera mounted on a gimbal or sensors such as GPS sensors or weather measurement sensors) to the ground station 101. The ground station 101 also includes data processing capabilities for processing the data received from the drone 102. Off-loading the data processing from the drone 102 to the ground station 101 reduces the weight of the drone 102 and also enables the use of more advanced data processing components that could not reasonably be incorporated within the size constraints and/or the payload capacities of small drone platforms. The ground station 101 may include any suitable component or components for performing the data processing, such as a central processing unit (CPU) and/or a graphics processing unit (GPU), and a memory unit. Housing the data processing components in the ground station 101 also enables more complex computational processing of the data received from the drone 102 compared to data processing performed onboard the drone. Accordingly, unlike conventional drone platforms in which the quality of the data received or gathered by the drone must be degraded (e.g., compressed) to be wirelessly transmitted to an electronic device on the ground (e.g., a remote control or a handheld cellular device), the ground station 101 of the present disclosure may receive and process raw or lossless data (e.g., 4 k resolution video) from the drone 102 and may utilize advanced data processing components for performing more complex computational processing of the data.

Additionally, in one or more embodiments, the ground station 101 is configured to function as a wireless router for transmitting data (e.g., live streaming of video or other data captured by the drone 102) to devices within wireless range of the ground station 101. Accordingly, in one or more embodiments, the ground station 101 may house a wireless transmitter.

In one or more embodiments, the tether 103 also houses a control line for transmitting flight control signals from the ground station 101 to the drone 102. The flight control signals may include altitude adjustment signals (i.e., adjusting the power supplied to the rotors of the drone 102) and attitude adjustment signals (e.g., signals for roll, yaw, and/or pitch) for adjusting the lateral position and/or orientation of the drone 102. The flight controls signals may be entered directly into the ground station 101 (e.g., via a touchscreen or other interface on the case) or may be transmitted to the ground station 101 by a remote device (e.g., a user's cellular device may send flight control signals to the ground station 101, which are then relayed via the tether 103 to the drone 102). In one or more embodiments, the flight control signals may be transmitted wirelessly (e.g., via radio frequency) to the drone 102.

The ground station 101 and the tether 103 also enable more precise and reliable positional control of the drone 102 compared to untethered drones operated wirelessly. For instance, the position of the ground station 101 may be set or determined (e.g., via a GPS unit in the ground station 101) and the global position of the drone 102 may be determined by determining the position of the drone 102 relative to the ground station 101. In one or more embodiment, the ground station 101 may include one or more components configured to determine the altitude of the drone 102 based on the length of tether 103 that has been unwound from the spool 108. The ground station 101 may include any suitable type of sensor for determining the extent to which the tether 103 has been unwound from the spool 108, such as an optical sensor or a magnetic sensor (e.g., a Hall-effect sensor). In one or more embodiments, the linear actuator 148 and the sensor 149 of the tether limiter device 147 may be used to determine the altitude of the drone 102. In one or more embodiments, the ground station 101 may enable precise positioning of the drone 102 even in GPS-deprived areas. For instance, the ground station 101 may send a control signal to the drone 102 (e.g., via the tether 103 or wirelessly) such that the drone 102 remains within a precise location or flight envelope relative to the ground station 101 (i.e., the drone 102 remains on station in reference to the signal received from the ground station 101). Additionally, in one or more embodiments, the ground station 101 may enable more precise positioning of the drone 102 compared to GPS positioning.

The ground station 101 and the tether 103 may be used with existing drones. Some existing drones include smart batteries that include a rechargeable battery pack with a built-in battery health monitoring system (BHMS) or battery management system (BMS). The BHMS or BMS is configured to determine the remaining charge in the battery pack and typically includes indicator lights or other indicia to inform the user of the remaining charge. Additionally, some existing drones are programmed to operate only when the smart battery is connected to the drone. Accordingly, in one or more embodiments, the UAV system 100 includes a mechanism for bypassing or circumventing the smart battery such that the drone 102 may receive power from the power supply 150 in the ground station 101 rather than from, or in addition to, an onboard smart battery.

Figure 1A:
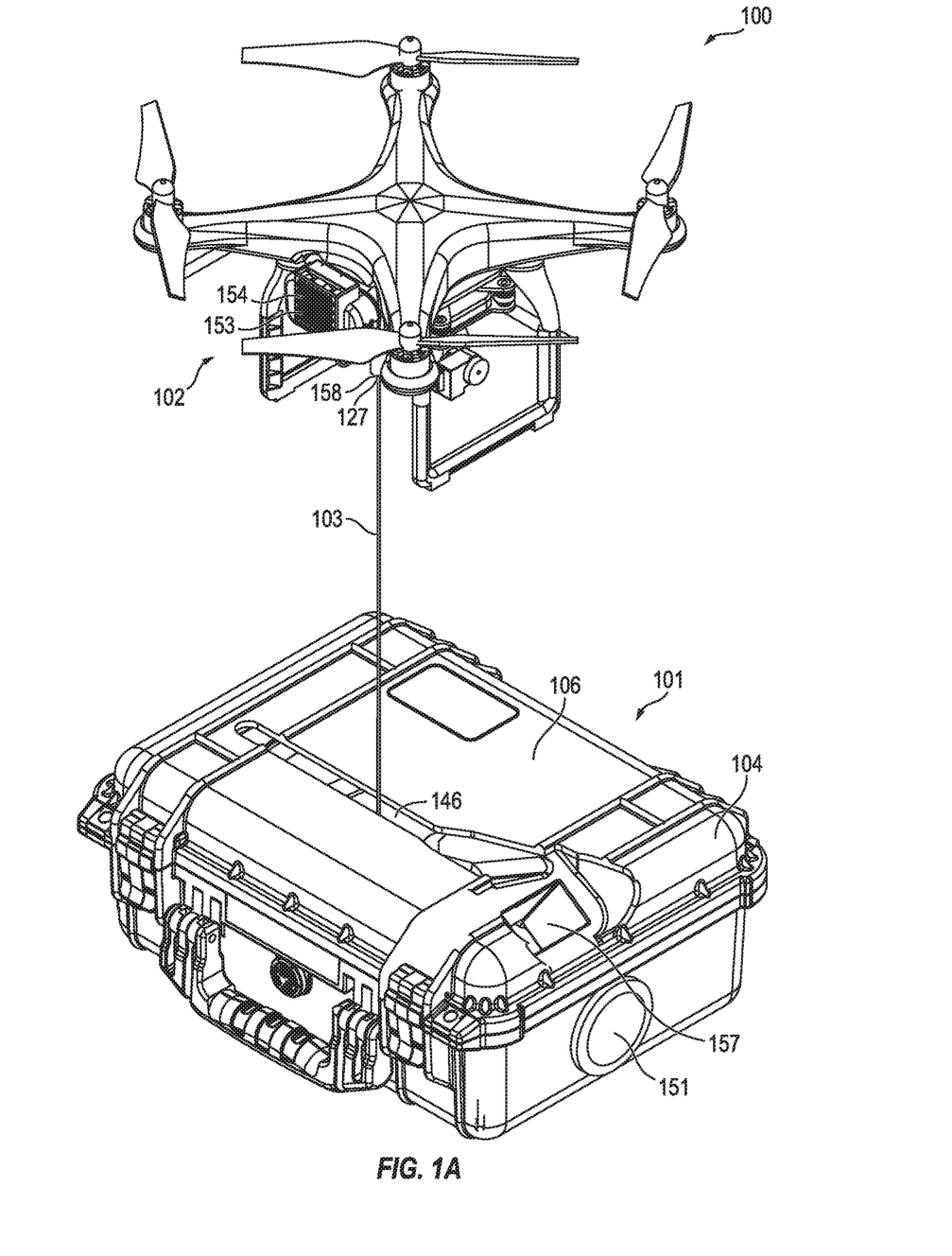
FIGS. 1A-1C are a perspective view, a top view, and a side view, respectively, of an unmanned aerial vehicle (UAV) system including a ground station and a tether according to one embodiment of the present disclosure, and an unmanned aerial vehicle connected to the tether.
Figure 2A:
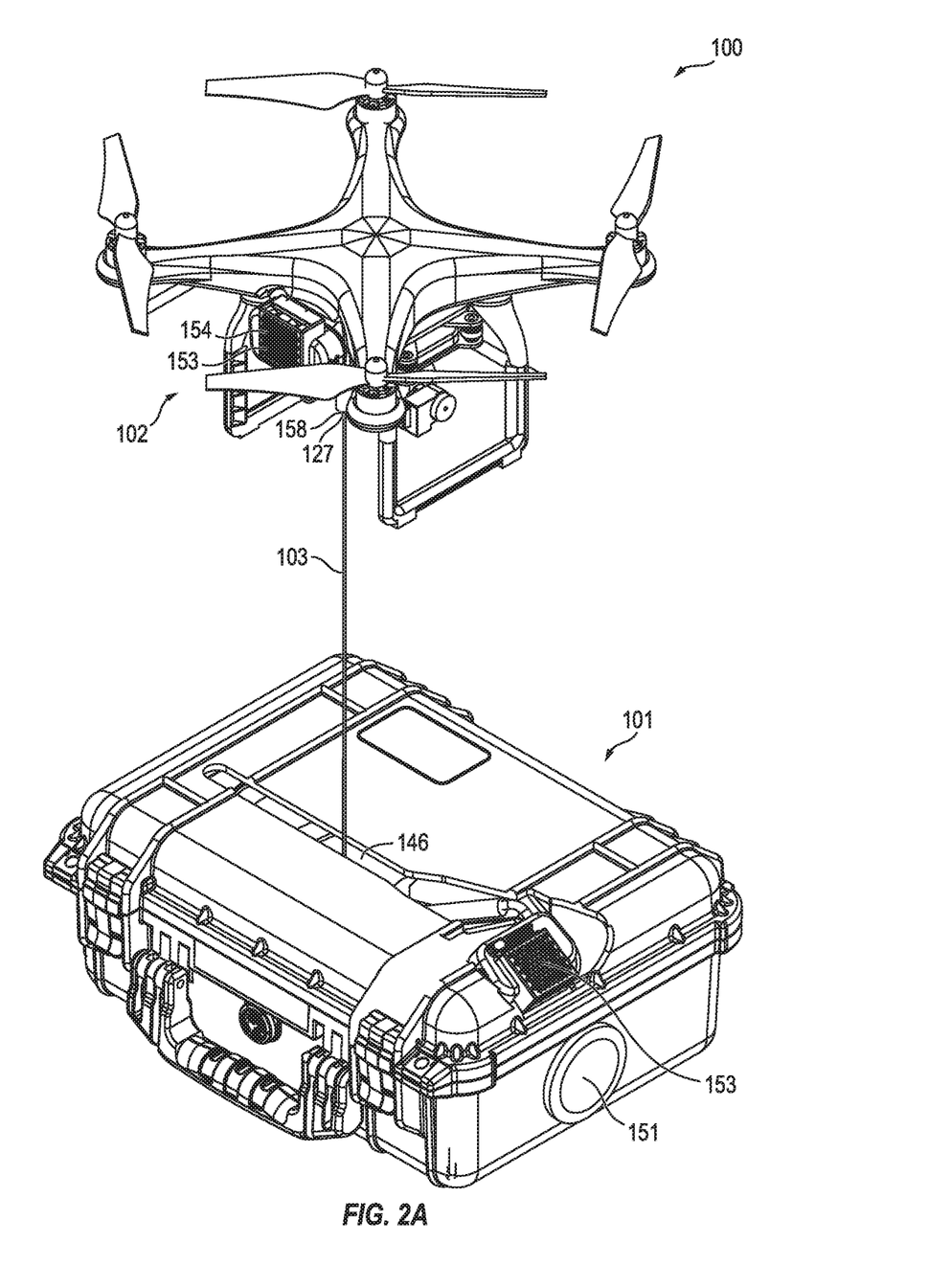
FIGS. 2A-2C are a perspective view, a top view, and a side view, respectively, of an unmanned aerial vehicle (UAV) system including a ground station and a tether according to one embodiment of the present disclosure, and an unmanned aerial vehicle connected to the tether.

With reference now to the embodiment illustrated in FIGS. 1A and 2A, the UAV system 100 includes a module 153 (e.g., a universal plug) configured to plug into a receptacle 154 in the drone 102 designed to receive the smart battery. The module 153 includes an electrical connector (e.g., electrical pins or electrical contacts) configured to connect with an electrical connector in the receptacle 154 of the drone 102. The module 153 also includes a high-voltage to low-voltage transformer configured to reduce the high-voltage power received from the power supply 150 in the ground station 101 to a lower voltage configured to operate the one or more low-voltage motors on the drone 102. In one or more embodiments, a relatively high-voltage may be supplied through the tether 103 to minimize or at least reduce transmission losses along the tether 103 and/or to minimize or at least reduce the diameter of the conductor transmitting the power inside the tether 103 to reduce the weight of the tether 103 that the drone carries as it flies. In one or more embodiments, the module 153 may include one or more mechanisms for dissipating heat from the module 153, such as an active or passive heat sink.

Figure 4:
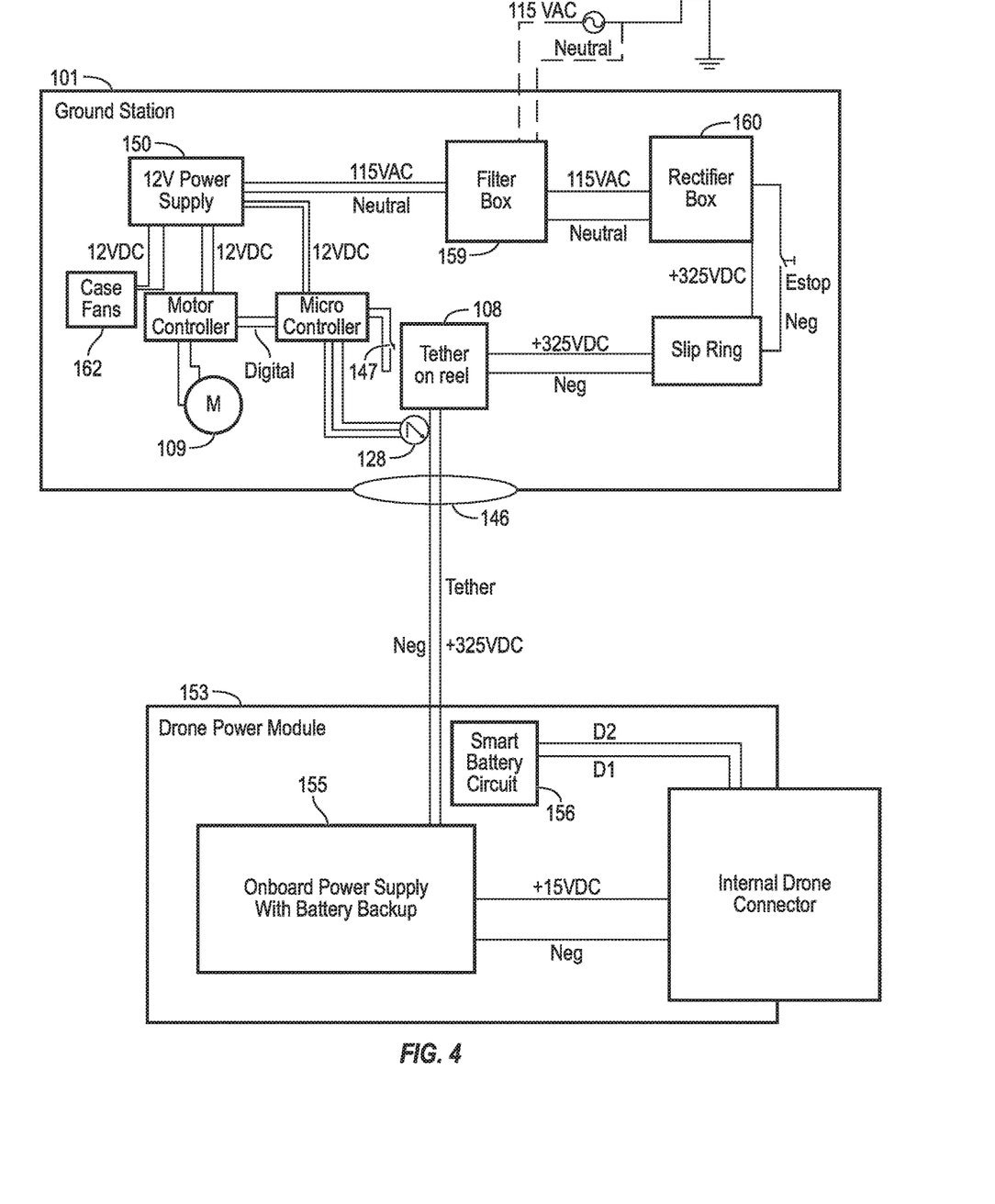
FIG. 4 is a schematic wiring diagram of a UAV system according to one embodiment of the present disclosure.

In the embodiment illustrated in FIG. 4, the module 153 includes an onboard power supply with battery backup 155. The onboard power supply with battery backup 155 is configured to supply an uninterruptible power supply (UPS) to the drone 102. For instance, the UAV system 100 may automatically switch to draw power from the onboard power supply with battery backup 155 if, for example, power supplied from the ground station 101 through the tether 103 is interrupted and/or if the high-to-low voltage transformer in the module 153 shuts down temporarily or permanently, such as due to overheating. Overheating of the transformer may occur, for example, when the drone 102 is trying to maintain GPS position and altitude (e.g., hover) in very windy and/or hot conditions. In such conditions, the drone's motors draw high power loads from the power supply 150 and less heat is dissipated by the cooling fan and the heat sink, which may cause the threshold shutdown temperature of the heat sink to be reached. When the power supply from the tether 103 is restored, the power supply 150 is configured to recharge the onboard power supply with battery backup 155 in the module 153 to maintain the uninterruptable power supply to the drone 102.

With reference now to the embodiment illustrated in FIGS. 1A-2C and 4, the built-in battery health monitoring system (BHMS) or the battery management system (BMS) of the smart battery (e.g., smart battery encryption circuitry and/or smart battery authentication circuitry 156) designed for use with the drone 102 is provided in the module 153. That is, the BHMS or the BMS that enables the drone 102 to draw power from the rechargeable battery pack of the smart battery designed for use with the drone 102 (e.g., the OEM smart battery provided with the drone 102) is provided in the module 153. The configuration of the smart battery circuitry 156 (e.g., authentication and/or encryption circuitry) varies depending on the type or kind of drone 102 (e.g., make, model, and/or power/size class) that the module 153 is configured to work with (i.e., the configuration of the smart battery circuitry 156 varies depending on the configuration of the smart battery that is designed to work with the drone 102).

In one or more embodiments, the module 153 may be a modular unit that may be detached from the end of the tether 103 and replaced with another module 153 having smart battery circuitry 156 that is designed to work with the drone 102 that will be used with the UAV system 100. That is, the module 153 may be interchangeable with another module 153 having smart battery circuitry 156 that is the same or similar to the smart battery circuitry provided in the smart battery configured for use with the drone 102 that will be used with the UAV system 100.

In one or more embodiments, the ground station 101 may include a receptacle 157 (e.g., an opening in the upper platform 105) (see FIGS. 2A-2C) for receiving the smart battery that is designed to work with the drone 102. The ground station 101 may also include a cable configured to electrically connect the BHMS or the BMS of the smart battery to the module 112 when the smart battery is in the receptacle 157 in the ground station 101. Accordingly, in one or more embodiments, when the smart battery is connected to the receptacle 157 in the ground station 101 and the module 153 is connected to the receptacle 154 in the drone 102 and the cable is connected to the module 153, the BHMS or the BMS of the smart battery is electrically connected to the drone 102. In one or more embodiments, the cable may be shorter than the tether 103 such that the cable is configured to connect to the drone 102 when the drone 102 is not flying or is flying at low altitudes. When the drone 102 is not flying and is positioned, for instance, on the ground or on the ground station 101, the connection between the BHMS or the BMS of the smart battery and the module 153 in the drone 102 enables the rotors of the drone 102 to be powered on for flight. Once the drone 102 has taken flight, however, the cable may be configured to disconnect from the module 153 to permit the drone 102 to fly up to the maximum range and ceiling permitted by the tether 103. Some existing drones 102 are programmed to require the BHMS or the BMS of the smart battery to be connected to the drone 102 for the drone 102 to power on and begin flying, but will continue flying even if the BHMS or the BMS of the smart battery becomes disconnected from the drone 102 during flight. In one or more embodiments, the tether 103 may house a cable connecting the BHMS or the BMS of the smart battery in the ground station 101 to the module 112 in the drone 102 such that BHMS or the BMS of the smart battery remains electrically connected to the drone 102 throughout the duration of the flight.

Figure 1B:
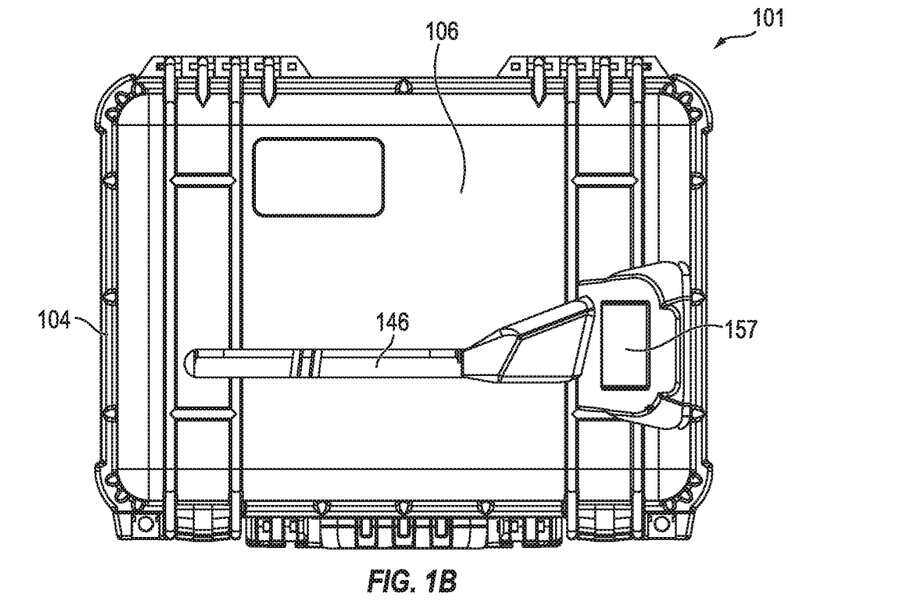
Figure 1C:
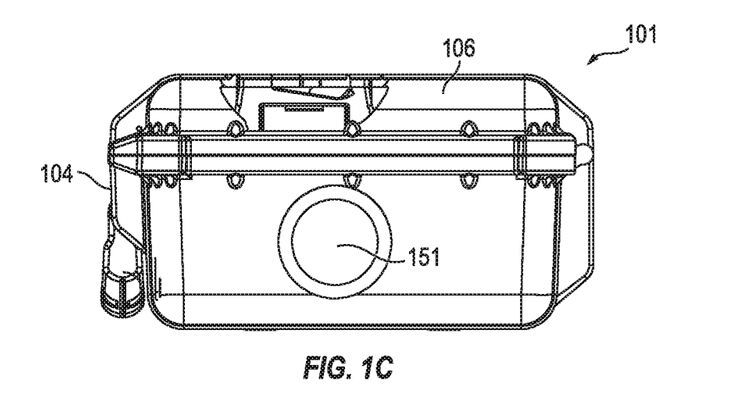
Figure 2B:
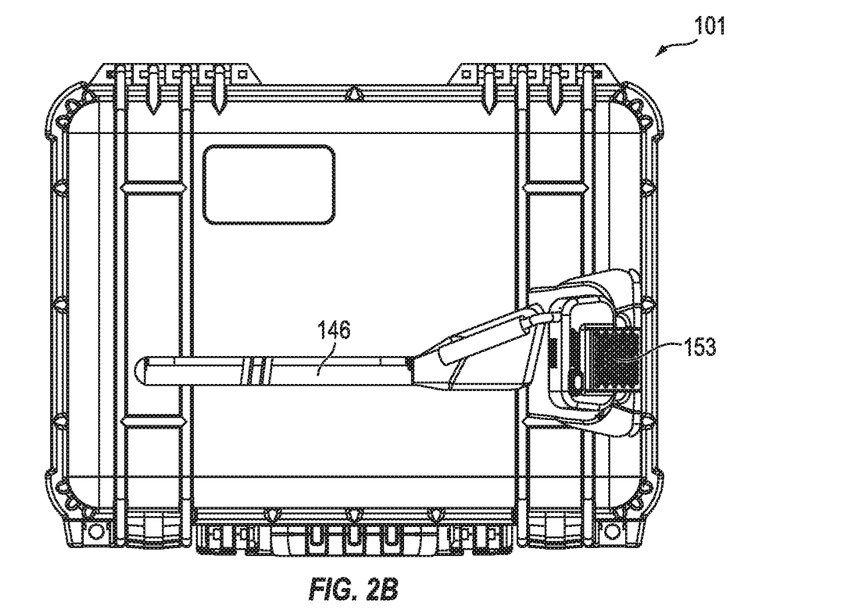
Figure 2C:
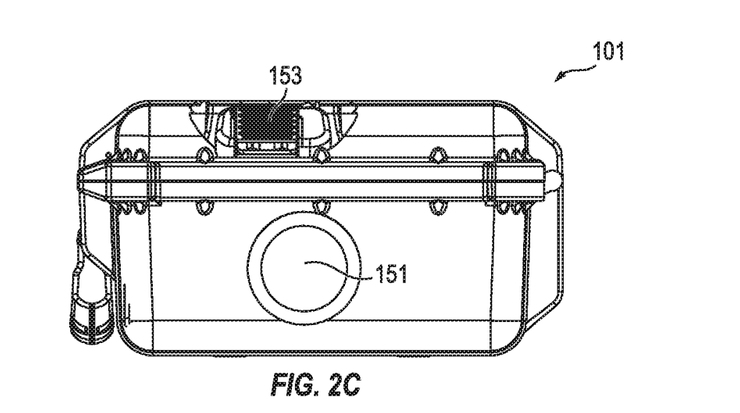

In one or more embodiments in which the BHMS or the BMS of the smart battery (e.g., the smart battery encryption circuitry and/or the smart battery authentication circuitry 156) is provided in the module 153, the ground station 101 may be provided without the receptacle 157 for the smart battery and without the cable connecting the receptacle to the module 153. Additionally, in one or more embodiments, the receptacle 157 may be provided in the case 104 even when the smart battery circuitry 156 is provided in the module 153. For instance, in one or more embodiments in which the smart battery circuitry 156 is provided in the module 153, the receptacle 157 may be used to conveniently store the smart battery of the drone 102 or the receptacle 157 may be used to store the module 153 (e.g., when the drone 102 is not in flight and the UAV system 100 is stored or being transported). FIGS. 1A-1C depict the module 153 connected to the receptacle 154 in the drone 102 and the receptacle 157 in the ground station 101 unused, and FIGS. 2A-2C depict the module 153 connected to the receptacle 157 in the ground station 101.

Additionally, in one or more embodiments in which the ground station 101 includes the receptacle 157, the receptacle 157 is configured (e.g., sized and shaped) to accommodate the smart battery and/or the module 153 of the drone 102 and the configuration of the smart battery and the module 153 may vary depending on the type (e.g., make, model, and/or power/size class) of the drone 102. In one or more embodiments, the receptacle 157 may be a modular unit that may be removed from the case 104 of the ground station 101 and replaced with another receptacle 157 having a configuration configured to accommodate the smart battery and/or the module 153 that are designed to work with the drone 102 that will be used with the UAV system 100. That is, the receptacle 157 may be interchangeable with another receptacle 157 having a configuration suitable for the type of drone 102, and the smart battery and the module 153 configured for use with that drone 102, that will be used with the UAV system 100.

In one or more embodiments, the UAV system 100 includes a mechanical connector 158 (e.g., a threaded connector or a bayonet-style connector) detachably connecting the free end 127 of the tether 103 to the module 153 in the drone 102. The mechanical connector 158 permits detachment of the drone 102 from the tether 103 when the drone 102 is not in flight. In one or more embodiments, the connector 158 may be a quick-release connector configured to facilitate detachment of the drone 102 from the tether 103 during flight. The quick-release connector 158 may have any suitable configuration for detaching the tether 103 from the drone 102. For instance, in one or more embodiments, the quick-release connector 158 may be configured to detach the drone 102 from the tether 103 when an electrical signal is transmitted from the ground station 101 through the tether 103 to the quick-release connector 158. In one or more embodiments, the quick-release connector 158 may be configured to detach the drone 102 from the tether 103 when a tensile force exceeding a threshold value is applied to the tether 103. Detaching the drone 102 from the tether 103 during flight enables the user to fly the drone 102 outside of the flight envelope that would be permitted if the drone 102 remained tethered to the ground station 101, which might otherwise require relocating the ground station 101. For instance, if an area of interest outside of the flight envelope defined by the tether 103 is spotted by the onboard camera or another sensor on the drone 102, the quick-release connector 158 may be actuated to detach the drone 102 from the tether 103 such that the user may fly the drone 102 to explore and/or surveil the new area of interest. Additionally, detaching the drone 102 from the tether 103 may permit retrieval of the drone 102 if the tether 103 becomes entangled (e.g., around a structure or a tree) during flight.

FIG. 4 is a schematic wiring diagram of the UAV system 100 according to one embodiment of the present disclosure. As illustrated in FIG. 4, the power supply 150 in the ground station 101 is coupled to an electronic filter 159. The signal output from the electronic filter 159 is transmitted to a rectifier 160 that converts the AC signal from the power supply 150 to a DC signal. In one or more embodiments, the rectifier 160 may be a voltage multiplier, such as a voltage doubler. The DC signal output from the rectifier 160 is transmitted to the tether 103 on the reel 108 via a slip ring 161. The slip ring 161 allows the electrical connection with the tether 103 to be maintained as the reel 108 is rotating to wind or unwind the tether 103. In the illustrated embodiment, the ground station 101 also includes a case fan 162 for cooling the ground station 101. In one or more embodiments, the ground station 101 may include one or more indicator lights (e.g., one or more LEDs) for indicated whether the ground station 101 is turned on or off.

Additionally, as illustrated in FIG. 4, the tether 103 is connected to the module 153, which includes the onboard power supply with battery backup 155 and the smart battery encryption circuitry 156, that is configured to be received in the receptacle 154 in the drone 102. As described above, in one or more embodiments, the tether 103 may be configured to disconnect from the module 153 and the drone 102 after the drone 102 has taken flight. Additionally, in one or more embodiments in which the ground station 101 includes the receptacle 157 configured to receive the smart battery and/or the module 153, a cable connected to the smart battery may be detachably connected to the module 153 or the drone 102 (e.g., via a magnetic connector or other type of detachable connector).

In one or more embodiments, the case 104 of the ground station 101 may house a wireless router for transmitting information such as visual information (e.g., still photographs and/or videos) to a remote electronic device (e.g., a desktop computer or a handheld electronic device such as a smart phone or a tablet computer) capable of displaying the visual information. For instance, in one or more embodiments, visual information captured by the drone 102 (e.g., via an on-board camera on the drone 102) may be transmitted to the ground station 101 (e.g., wirelessly or via the tether 103) and then the wireless router may transmit the visual information to one or more remote electronic devices (e.g., computers or smart phones). In this manner, third parties may stream (e.g., in real-time) video captured by a camera onboard the drone 102.

In one or more embodiments, the case 104 of the ground station 101 may house a transponder for transmitting positional information (e.g., GPS coordinates) of the ground station 101 to a remote electronic device configured to receive the transmitted positional information. For instance, in one or more embodiments, the transponder may be configured to transmit positional information of the ground station 101 to one or more nearby airport towers so that air traffic controllers can utilize the positional data to ensure aircraft safety and/or verify the ground station 101 and the drone 102 are being operated in a safe and legal location. For additional safety, the case 104 of the ground station 101 may house a device (e.g., a device similar to automatic dependent surveillance-broadcast (ADS-B)) that interrogates other aircraft, and commands the drone 102 to take appropriate action (e.g., land) if an aircraft comes closer than a specified threshold relative to the drone 102.

With reference now to the embodiment illustrated in FIG. 6, the UAV system 100 may include a carrying device 163 for transporting the ground station 101. In the illustrated embodiment, the carrying device 163 includes a pair of shoulder straps 164 and a series of fasteners (e.g., hooks) 165 configured to engage the case 104 of the ground station 101. In one or more embodiments, the case 104 of the ground station 101 may include a handle 166 for facilitating transportation of the ground station 101. In one or more embodiments, the carrying device 163 may have any other configuration suitable for enabling a user to transport the ground station 101.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. One or more of the described features may be combined with one or more other described features to provide a workable device. Although relative terms such as "outer," "inner," "upper," "lower," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," and similar terms are used as terms of approximation and not as terms of degree, and are intended to account for the inherent deviations in measured or calculated values that would be recognized by those of ordinary skill in the art. Furthermore, as used herein, when a component is referred to as being "on" another component, it can be directly on the other component or components may also be present therebetween. Moreover, when a component is referred to as being "coupled" or "connected" to another component, it can be directly attached to the other component or intervening components may be present therebetween.

What is claimed is:

1. An unmanned aerial vehicle system, comprising:
 a ground station, comprising:
  a case;
  a power supply housed in the case; and
  a tether having a first end and a second end opposite to the first end, the first end of the tether coupled to the case; and
 a module comprising smart battery authentication circuitry configured to be coupled to the second end of the tether,
 wherein the module is configured to be connected to an unmanned aerial vehicle,
 wherein the smart battery authentication circuitry enables the unmanned aerial vehicle to receive power from the power supply housed in the case when the module is connected to the unmanned aerial vehicle, and
 wherein the ground station comprises a receptacle configured to accommodate the module.

2. The unmanned aerial vehicle system of claim 1, further comprising a spooling system housed in the case configured to retract and deploy the tether from the case.

3. The unmanned aerial vehicle system of claim 2, wherein the spooling system comprises:
 a reel;
 a drive motor coupled to the reel, the drive motor configured to rotate the reel; and
 a roller configured to apply tension to the tether, the roller configured to pivot relative to the reel.

4. The unmanned aerial vehicle system of claim 3, further comprising a level-winder assembly configured to substantially evenly distribute the tether along the reel as the drive motor is operated to rewind the tether around the reel.

5. The unmanned aerial vehicle system of claim 3, further comprising a tether limiter device configured to stop the reel from rotating once a maximum length of the tether has been unwound from the reel.

6. The unmanned aerial vehicle system of claim 1, wherein the ground station further comprises a processor housed in the case for processing data received from the unmanned aerial vehicle.

7. The unmanned aerial vehicle system of claim 1, wherein the module further comprises:
 a transformer; and
 at least one electrical contact for electrically coupling the module to the unmanned aerial vehicle.

8. The unmanned aerial vehicle system of claim 1, further comprising a quick-release connector coupled to the second end of the tether, the quick-release connector configured to detach the unmanned aerial vehicle from the tether while the unmanned aerial vehicle is in flight.

9. The unmanned aerial vehicle system of claim 1, further comprising a wireless router housed in the case, the wireless router configured to transmit visual information received from the unmanned aerial vehicle to a remote electronic device.

10. The unmanned aerial vehicle system of claim 1, further comprising a transponder housed in the case, the transponder configured to transmit a location of the ground station.

11. An unmanned aerial vehicle system, comprising:
a ground station, comprising:
   a case;
   a power supply housed in the case; and
   a tether having a first end and a second end opposite to the first end, the first end of the tether coupled to the case; and
   a spooling system housed in the case configured to retract and deploy the tether from the case, the spooling system comprising:
      a reel;
      a drive motor coupled to the reel, the drive motor configured to rotate the reel;
      a roller configured to apply tension to the tether, the roller configured to pivot relative to the reel; and
      a level-winder assembly configured to substantially evenly distribute the tether along the reel as the drive motor is operated to rewind the tether around the reel; and
a module comprising smart battery authentication circuitry configured to be coupled to the second end of the tether,
wherein the module is configured to be connected to an unmanned aerial vehicle, and
wherein the smart battery authentication circuitry enables the unmanned aerial vehicle to receive power from the power supply housed in the case when the module is connected to the unmanned aerial vehicle, and
wherein the level-winder assembly comprises:
a guide defining an opening configured to accommodate the tether, the guide configured to pivot in a reciprocal manner; and
an actuator having a first end coupled to the guide and a second end coupled to the drive motor, the actuator configured to reciprocate to pivot the guide,
wherein operation of the drive motor to rotate the reel is configured to reciprocate the actuator and pivot the guide.

12. The unmanned aerial vehicle system of claim 11, wherein the case further comprises a platform to support the unmanned aerial vehicle, and wherein the platform defines an opening configured to accommodate the tether.

13. The unmanned aerial vehicle system of claim 12, wherein the opening is a straight slot or a sinusoidal-shaped opening.

14. An unmanned aerial vehicle system, comprising:
a ground station, comprising:
   a case;
   a power supply housed in the case;
   a tether having a first end and a second end opposite to the first end, the first end of the tether coupled to the case;
   a spooling system housed in the case configured to retract and deploy the tether from the case, the spooling system comprising:
      a reel;
      a drive motor coupled to the reel, the drive motor configured to rotate the reel;
      a roller configured to apply tension to the tether, the roller configured to pivot relative to the reel; and
      a tether limiter device configured to stop the reel from rotating once a maximum length of the tether has been unwound from the reel; and
a module comprising smart battery authentication circuitry configured to be coupled to the second end of the tether,
wherein the module is configured to be connected to an unmanned aerial vehicle,
wherein the smart battery authentication circuitry enables the unmanned aerial vehicle to receive power from the power supply housed in the case when the module is connected to the unmanned aerial vehicle, and
wherein the tether limiter device comprises:
a linear actuator coupled to the drive motor, the drive motor configured to move the linear actuator between a first position when the tether is fully rewound around the reel and a second position when the tether is fully unwound from the reel; and
a sensor configured to detect when the linear actuator is in the second position, wherein the sensor is configured to send a signal to stop the drive motor from rotating the reel when the sensor detects that the linear actuator is in the second position.

15. The unmanned aerial vehicle system of claim 14, wherein the sensor is an optical switch.

* * * * *